United States Patent
Duerre et al.

(10) Patent No.: US 12,313,143 B2
(45) Date of Patent: May 27, 2025

(54) SHAFT VIBRATION ABSORBER

(71) Applicant: Vibracoustic SE, Darmstadt (DE)

(72) Inventors: Markus Duerre, Neuenburg am Rhein (DE); Joschka Gutmann, Staufen im Breisgau (DE); Christian Paul, Auggen (DE); Manuel Sommerfeld, Freiburg (DE); Hagen Kessler, Müllheim (DE); Jörg Hess, Kandern (DE)

(73) Assignee: Vibracoustic SE, Darmstadt (DE)

( * ) Notice: Subject to any disclaimer, the term of this patent is extended or adjusted under 35 U.S.C. 154(b) by 445 days.

(21) Appl. No.: 17/714,562

(22) Filed: Apr. 6, 2022

(65) Prior Publication Data
US 2022/0325775 A1 Oct. 13, 2022

(30) Foreign Application Priority Data
Apr. 9, 2021 (DE) .......................... 102021108890.9

(51) Int. Cl.
*F16F 15/14* (2006.01)
*F16F 15/32* (2006.01)

(52) U.S. Cl.
CPC ........ *F16F 15/1442* (2013.01); *F16F 15/322* (2013.01); *F16D 2300/22* (2013.01)

(58) Field of Classification Search
CPC .. F16F 15/1442; F16F 15/322; F16D 2300/22
USPC ................................. 464/127, 180; 188/379
See application file for complete search history.

(56) References Cited

U.S. PATENT DOCUMENTS

| 1,580,327 | A | * | 4/1926 | Ramsey | F16D 3/12 |
| | | | | | 464/180 |
| 4,951,930 | A | * | 8/1990 | Uno | F16F 13/22 |
| 5,352,157 | A | | 10/1994 | Ochs et al. | |
| 6,623,365 | B1 | | 9/2003 | Maretzke et al. | |
| 6,837,345 | B1 | | 1/2005 | Lauble | |

(Continued)

FOREIGN PATENT DOCUMENTS

| CN | 104653700 A | 5/2015 |
| CN | 107735594 A | 2/2018 |

(Continued)

OTHER PUBLICATIONS

European Search Report, 22160095, dated Sep. 8, 2022.
(Continued)

*Primary Examiner* — Greg Binda
(74) *Attorney, Agent, or Firm* — Fishman Stewart PLLC

(57) ABSTRACT

A shaft vibration absorber for absorbing vibrations of a shaft includes an elastomer body that is reached through by a central longitudinal centre axis. In embodiments, the elastomer body includes holding geometries that protrude in the radial direction and extend in the longitudinal direction for pressing the shaft vibration absorber to the shaft. The holding geometries may be arranged in each case in two first angle windows that lie opposite one another with regard to the longitudinal centre axis with a width of in each case at most 90°. With embodiments, the shaft vibration absorber can configure a radial pressing force of the shaft along a first tuning axis that runs in the radial direction, and the radial pressing force may be greater than a pressing force in a spatial direction that differs therefrom and runs in the radial direction.

21 Claims, 6 Drawing Sheets

(56) References Cited

U.S. PATENT DOCUMENTS

| | | | |
|---|---|---|---|
| 8,832,941 | B1 | 9/2014 | Pennington |
| 9,033,807 | B1 | 5/2015 | Ley |
| 2003/0159898 | A1 | 8/2003 | Haneishi |
| 2008/0164114 | A1* | 7/2008 | Kawashima .......... F16F 1/3849 188/379 |
| 2011/0247908 | A1 | 10/2011 | Takko |
| 2015/0137437 | A1 | 5/2015 | Mueller |
| 2018/0094693 | A1 | 4/2018 | Schmidt |

FOREIGN PATENT DOCUMENTS

| | | |
|---|---|---|
| DE | 4201049 A1 | 7/1993 |
| DE | 19821165 A1 | 11/1999 |
| DE | 10250580 A1 | 6/2003 |
| JP | H0723837 U | 5/1995 |
| JP | 2007092934 A | 4/2007 |
| JP | 2009061893 A | 3/2009 |
| KR | 20190001074 A | 1/2019 |
| KR | 102020348 B1 | 11/2019 |
| SU | 1388621 A * | 4/1988 ............. 464/180 |

OTHER PUBLICATIONS

German Office Action, 102021108890.9, dated Oct. 14, 2021 with google translation.
Chinese Office Action and Search Report dated May 31, 2024, CN202210330134.4 (w_translation).
Machine English translation for JP H0723837.
German Examination Report dated Feb. 15, 2023 for German Patent Application No. 10 2021 108 890.9.
Chinese Office Action and Search Report dated Jan. 13, 2025, CN202210330134.4 (w_translation).

* cited by examiner

Prior Art

SHAFT VIBRATION ABSORBER

CROSS-REFERENCE TO RELATED APPLICATIONS

This application claims priority to German Patent Application No. DE 10 2021 108 890.9, filed Apr. 9, 2021, the contents of which are hereby incorporated by reference in its entirety.

TECHNICAL FIELD

The invention relates to shaft vibration absorbers and to assemblies.

BACKGROUND

In the case of rear-wheel-drive and all-wheel-drive vehicles, the power of an engine which is arranged in the front of the vehicle is transmitted by means of a longitudinal shaft and lateral shafts to the rear wheels. The longitudinal shaft connects the engine or the transmission block to a differential gear and can be configured in multiple parts. The differential gear is connected via the lateral shafts to the wheel hubs of the rear wheels. The shafts have natural modes which can be excited during the running up of the shafts. The excitation of the natural modes leads to imbalance forces which act on the bearing points of the shafts which in turn cause noise in the vehicle.

In order to reduce this noise, an absorber which is shown in FIG. 1 is known from practice, which absorber can be fastened as a corotating absorber to the corresponding shaft. The absorber is tuned radially to the corresponding frequency of the natural mode of the shaft, in order to reduce the boosting of the natural mode. As a result, the noise in the vehicle which is produced by way of the excitation of the natural modes can be reduced. The absorber can be, for example, an internal tube absorber which can be fastened in an inner cavity of a hollow tube, or else can be a lateral shaft absorber which can be fastened to a shaft on the outer circumferential face tube absorber. For fastening purposes, the absorber can be pressed via an elastomer part to the shaft, which elastomer part brings about a radial pressing force on the shaft. An axial force for mounting of the absorber on a shaft is set via frictional forces as a result of the pressing force.

During the tuning of the absorber to the natural mode of the shaft, the radial natural mode of the shaft is tuned to the bending natural frequency of the shaft equally in all radial directions. An absorber of this type can also be called a radial absorber. This applies to known internal tube absorbers and likewise to known lateral shaft absorbers, for which reason they are of rotationally symmetrical configuration about the longitudinal centre axis and have a number of sometimes eight and more. This influences the axial pressing-in force or pressing-on force for the mounting of the absorber in or on the shaft if the pressing force is applied by way of the elastomer part and there is no additional fastening sleeve. The elastomer part is at the same time responsible for the radial natural mode of the absorber. The axial force for the mounting of the absorber on the shaft must not undershoot a lower threshold value, in order to prevent the absorber slipping axially along the shaft over the service life and its effect being reduced or totally lost as a result of the positional change. In particular at low tuning frequencies which are smaller than 120 Hz, an assisting fastening sleeve is as a rule required in the case of internal tube absorbers, and a fastening element, for example an assisting hose clip, is as a rule required in the case of lateral shaft absorbers, in order to hold the position of the absorber. This causes additional costs and an undesirably increased mounting complexity.

SUMMARY

It is therefore an object of the invention to propose a shaft vibration absorber for absorbing vibrations of the shaft, which shaft vibration absorber has reduced mounting complexity and reduced costs.

Aspects and features associated with embodiments of the invention are disclosed herein.

According to aspects of the invention, therefore, a shaft vibration absorber for absorbing vibrations of a shaft is proposed, comprising an elastomer body which is reached through by a central longitudinal centre axis, the elastomer body having holding geometries which protrude in the radial direction and extend in the longitudinal direction for pressing the shaft vibration absorber to the shaft, the holding geometries being arranged in each case in two first angle windows which lie opposite one another with regard to the longitudinal centre axis with a width of in each case at most 90°, with the result that the shaft vibration absorber can configure a radial pressing force of the shaft along a first tuning axis which runs in the radial direction, which radial pressing force is greater than a pressing force in a spatial direction which differs therefrom and runs in the radial direction. The radial pressing force which can be configured can be, for example, at least 400 N, preferably at least 450 N, further preferably at least 500 N, in order to be greater than an axial pressing-out force which attempts to displace the shaft vibration absorber axially and/or radially out of its mounted state.

The shaft vibration absorber according to the invention is therefore distinguished by the fact that it is not tuned identically in all radial directions, or has different tuning in radial directions. Rather, it can achieve different absorbing frequencies in the radial direction. This fundamental concept is realised structurally by way of the angle windows which lie opposite one another and have the holding geometries, which may be the only holding geometries. The shaft vibration absorber therefore has at least two tuning axes which differ in terms of their function and tuning.

Tuning axes run in the radial direction. They can intersect the longitudinal centre axis of the shaft vibration absorber. Opposed tuning directions can extend along each tuning axis. The tuning directions on a tuning axis can be assigned identical tuning frequencies. The first tuning axis can run centrally through the two first angle windows.

The shaft vibration absorber is tuned or can be tuned highly along the first tuning axis by means of the holding geometries. It is hard in this direction. This first tuning axis can also be called a sacrificial axis, since the absorber capacity in these directions is sacrificed to simple compressibility. It has been shown, however, that the negative influence of the high tuning along the first tuning axis on the capacity of the shaft vibration absorber for tuning to the bending natural mode of the shaft is negligibly small. A sufficiently high axial pressing force can be realised by way of this high tuning along the first tuning axis. The fastening sleeve, used by the prior art, in order to ensure a sufficient pressing force can be dispensed with. The holding geometries which are contained in the first angle windows can ensure a sufficient pressing force for long-term fixing of the shaft vibration absorber on the shaft.

The shaft vibration absorber is tuned or can be tuned to the tuning frequency for the bending natural mode of the shaft along the spatial direction which differs from the first tuning axis or along a second tuning axis which differs from the first tuning axis. It is soft in this direction. The primary function of the shaft vibration absorber or its structures there is frequency tuning.

The shaft vibration absorber according to the invention is accordingly no longer a radial absorber, but rather a uniaxial absorber which fixes along a defined tuning axis and absorbs along a tuning axis which differs therefrom. The shaft vibration absorber according to the invention is more rigid along the first tuning axis than in the spatial direction which differs therefrom and/or with respect to the second tuning axis. The rigidity difference can be at least 20%, preferably at least 30%, further preferably at least 40%, even further preferably at least 50%. The configuration, which is more rigid in the radial direction in comparison with every other spatial direction, along the first tuning axis leads to the first tuning axis specifying a defined vibration direction. Accordingly, in the state of use, the shaft vibration absorber can vibrate along a defined vibrating axis in the two vibrating directions. The vibrating axis may correspond to the second tuning axis. It has been recognised that different absorbing frequencies can be achieved in the radial direction in a manner which is determined by way of holding geometries in the case of corresponding contouring of the elastomer body. In the case of the shaft vibration absorber according to the invention, the holding geometries can therefore be spaced apart from one another inhomogeneously in the circumferential direction.

The two first angle windows can fundamentally be of equal or non-equal magnitude. It is conceivable that the first angle window width is determined by the outer geometry, such as for example an edge, a side edge of the holding face in the circumferential direction, a side wall or an edge on the side wall base, of the at least one holding geometry which is arranged on the angle window.

The elastomer body can comprise a main body which surrounds an absorber mass. The holding geometries can protrude from this.

The shaft vibration absorber according to the invention can be an internal tube absorber, in the case of which the holding geometries extend radially to the outside. It can also be a lateral shaft absorber, however, in the case of which the holding geometries extend radially to the inside.

A premounting state is to be understood to mean a situation, in which the shaft vibration absorber is not pressed to a shaft and is without an external action of force. A mounting state is to be understood to mean a situation, in which the shaft vibration absorber is pressed to a shaft. A holding geometry is to be understood to mean a structure or an arrangement of structures which serves primarily, preferably exclusively, to hold or press the shaft vibration absorber. Primary means that the holding geometry fulfils a function predominantly. It cannot be ruled out with absolute certainty with regard to the holding geometries that, in addition to the primary holding function, they also unintentionally or unavoidably fulfil other functions, such as for example an absorbing function. This subordinate function which is subordinate with respect to the primary function is a long way short of the primary function with regard to its effect which is caused by the holding geometries. Other structures of a shaft vibration absorber which do not primarily serve to hold the shaft vibration absorber are therefore to be distinguished from the holding geometries. For example, radial stop means (or radial stop) serve primarily to limit a radial deflection travel, although they can protrude in the radial direction just like the holding geometries. Structures which bear many against the shaft without, however, applying a significant pressing force for holding the shaft vibration absorber are also conceivable, it not being possible for these structures to be understood as holding geometries either. Use state is to be understood to mean a situation, in which the shaft vibration absorber rotates with the shaft in the mounting state. An angle window can have the form of a circle segment, the two circle radii meeting in the longitudinal centre axis of the shaft vibration absorber.

In accordance with one conceivable development of the shaft vibration absorber according to the invention, it is configured in such a way that, in the mounting state, at least 60% of the pressing force which holds the shaft vibration absorber is applied by the holding geometries within the first two angle windows, preferably at least 70%, further preferably at least 80%, even further preferably at least 90%, very particularly preferably at least 95%. The greater the proportion of the pressing force of the holding geometries within the first angle windows, the harder the shaft vibration absorber is designed to be along the first tuning axis.

In accordance with one conceivable development of the shaft vibration absorber according to the invention, the holding geometries comprise bearing faces, via which they can bear against the shaft in the mounting state. These bearing faces may be arranged on the distal inner or outer circumferential faces of the holding geometries. It is conceivable that, in the premounting state, the bearing faces lie on an imaginary cylindrical surface, the longitudinal centre axis of which is coaxial with the longitudinal centre axis of the shaft vibration absorber. As a result, a homogeneous stress distribution is insured in the holding geometry in the mounting state.

In accordance with one conceivable development of the shaft vibration absorber according to the invention, it comprises merely two tuning axes, the first tuning axis may be arranged orthogonally with respect to the second tuning axis. As a result, a shaft vibration absorber can be configured which holds in the spatial directions along the first tuning axis and vibrates in the spatial directions, running at a right angle with respect thereto, along the second tuning axis.

In accordance with one conceivable development of the shaft vibration absorber according to the invention, the elastomer body is configured monolithically with the holding geometries. It is conceivable that the elastomer body is free from an integrally joined connection to a stabilizing element, in particular a fastening sleeve.

In accordance with one development of the shaft vibration absorber according to the invention, at least one of the holding geometries has at least one longitudinal holding web. It is conceivable that precisely one longitudinal holding web is provided per holding geometry and is included by the latter. Two, three or more longitudinal holding webs per holding geometry are also conceivable, however. It is conceivable that adjacent longitudinal holding webs of a holding geometry are arranged equidistantly in the circumferential direction. It is conceivable that the two holding geometries within the two first angle windows are of identical or different configuration. The advantage of a space, formed by the web groove, between adjacent longitudinal holding webs or of web grooves within a first angle window is that the holding geometry or the longitudinal holding webs can spread out in an improved manner during mounting.

In accordance with one conceivable development of the shaft vibration absorber according to the invention, the side walls of at least one longitudinal holding web, which may comprise all longitudinal holding webs, run in a parallel or tilted manner with respect to the first tuning axis. The tilting can take place in a positive manner, with the result that a longitudinal retaining web which is trapezoidal in cross section is configured, the short side of which faces away from the shaft vibration absorber. The tilting can also take place in a negative manner, however, with the result that the longitudinal holding web which is trapezoidal in cross section is configured, the long side of which faces away from the shaft vibration absorber. The side which faces away can comprise the holding face. In the case of positive tilting, an angle in the transition between the longitudinal holding web and the adjacent section of the elastomer body can be increased, which leads to a reduction in stress in the mounting and use state and, as a result, leads to an increase in the service life. This transition can additionally have a radius. The longitudinal holding webs can be of ring segment-like configuration in cross section.

In accordance with one development of the shaft vibration absorber according to the invention, the two first angle windows enclose at least two second angle windows with one another in the circumferential direction, these second angle windows may be configured as intermediate clearances or comprising intermediate clearances of this type and/or being free from holding geometries which primarily serve for pressing to the shaft. Accordingly, the second angle windows can advantageously serve to ensure vibration of the shaft bearing which is as free as possible in the use state. The second angle windows can be enclosed directly by the first angle windows. It is conceivable that the shaft bearing comprises precisely two second angle windows. The second angle windows can be of open or closed configuration on one side or on both sides in the longitudinal direction. It is also conceivable that the holding geometries of the two first angle windows enclose at least two intermediate clearances with one another in the circumferential direction.

In accordance with one conceivable development of the shaft vibration absorber according to the invention, the second angle windows in each case comprise a space of ring segment-like cross section. The ring segment-like space can extend in the circumferential direction between the two first angle windows or the adjacent holding geometries of the two first angle windows and/or can be delimited in the radial direction on the one side by the elastomer body, by the absorber mass or by the elastomer section which surrounds the absorber mass directly and on the other side can be open. The opening in the radial direction can be present radially to the outside in the case of an internal tube absorber, and can be present radially to the inside in the case of a lateral shaft absorber.

In accordance with one conceivable development of the shaft vibration absorber according to the invention, the holding geometries are arranged exclusively within the first angle windows. As a result, the shaft vibration absorber can be tuned in a very hard manner along the first tuning axis and, as it were, can be tuned in a very soft manner along another tuning axis.

In accordance with one development of the shaft vibration absorber according to the invention, the holding geometries are arranged in a rotationally symmetrical manner with regard to the longitudinal centre axis, such as with a number of two. In addition or as an alternative, the holding geometries can be arranged in a mirror-symmetrical manner with regard to a central longitudinal centre plane. The longitudinal centre axis of the shaft vibration absorber lies in this central longitudinal centre plane. As a result, the two first angle windows can be of identical configuration.

In accordance with one conceivable development of the shaft vibration absorber according to the invention, the holding geometries of the first angle windows lie diametrically opposite one another with regard to the longitudinal centre axis. As a result, the first tuning axis can intersect to the longitudinal centre axis of the shaft vibration absorber.

In accordance with one development of the shaft vibration absorber according to the invention, the angular sum of the second angle windows with regard to the longitudinal centre axis in a cross section of the shaft vibration absorber is at least 180°, preferably at least 220°, further preferably at least 240°. As a result, a great inner or outer circumferential area of the shaft vibration absorber can be utilized in order to configure a radial deflection travel.

In accordance with one conceivable development of the shaft vibration absorber according to the invention, the angular sum of the first angle windows with regard to the longitudinal centre axis in a cross section of the shaft vibration absorber is at most 140°, preferably at most 120°, further preferably at most 90°. As a result, small windows and as it were small overlap widths between the holding geometries and the shaft can be realised, which in turn increases the space for vibration of the shaft vibration absorber. A great inner or outer circumferential area of the shaft vibration absorber can be utilized in order to configure a radial deflection travel.

In accordance with one development of the shaft vibration absorber according to the invention, the angular sum of circumferential-side holding faces of the holding geometries with regard to the longitudinal centre axis in a cross section is at most 180°, preferably at most 160°, further preferably at most 140°, even further preferably at most 120°. At most 100° is also conceivable. The holding faces can be inner or outer circumferential-side holding faces, depending on the shaft vibration absorber type. The holding faces which are arranged in the first angle windows may be of equal size on both sides of the longitudinal centre axis.

In accordance with one conceivable development of the shaft vibration absorber according to the invention, this shaft vibration absorber comprises an absorber mass which is surrounded by the elastomer body at least in sections, preferably completely, and is made from a different material. The absorber mass can be formed from a metal. A radial stop without metallic noise can be realised, and anti-corrosion protection of the mass can be achieved.

In accordance with one development of the shaft vibration absorber according to the invention, it is free from a stabilizing element, in particular a fastening sleeve or a clip, the holding geometries may extend between the absorber mass and its respective holding face and/or in the radial extent without a stabilizing element, in particular a fastening sleeve, being connected in between. A stabilizing element is distinguished by the fact that is of cylindrical configuration and, in the mounting state, ensures a radial pressing force which is greater than an axial pressing-out force, in order to fix an absorber in the long term. Stabilizing elements of this type are superfluous as a result of the configuration of the longitudinal holding webs and the arrangement explicitly in the two first angle windows. As a result, manufacturing costs and mounting complexity are reduced considerably.

In accordance with one conceivable development of the shaft vibration absorber according to the invention, a longitudinal recess in the absorber mass is situated in the radial direction behind at least one of the holding geometries. The same applies analogously to longitudinal holding webs. As a result, an elastomer geometry can be configured which has a greater radial extent than without a longitudinal recess. As a result, the hardness in the direction of the first tuning axis and the vibration capability of the deflection capability transversely with respect thereto can also be influenced.

In accordance with one conceivable development of the shaft vibration absorber according to the invention, at least one of the holding geometries has at least one web groove which extends in the longitudinal direction. The web groove divides sections of the holding geometry in the circumferential direction. It can be arranged, for example, between longitudinal holding webs. The web groove can have a radial extent from the radial extent of the holding geometry or the adjacent longitudinal holding webs. It can also be of shorter configuration, however, for example can have half or a third of a radial extent of the radial extent of the holding geometry or the adjacent longitudinal holding webs. The advantage of a space, formed by the web groove, between adjacent longitudinal holding webs or of web grooves within a first angle window is that the holding geometry or the longitudinal holding webs can spread out in an improved manner during mounting.

In accordance with one conceivable development of the shaft vibration absorber according to the invention, the web grooves are of V-shaped, U-shaped, semi-oval or semi-circular configuration in cross section. It is conceivable that the web groove is extended parallel to the longitudinal centre axis of the shaft vibration absorber.

In accordance with one development of the shaft vibration absorber according to the invention, in the unloaded pre-mounting state of the shaft vibration absorber, the holding faces lie on a first imaginary cylindrical surface with a first cylinder diameter and, in the mounting state of the shaft vibration absorber, in which it can be pressed to the shaft, the holding faces can lie on a second imaginary cylindrical surface with a second cylinder diameter, either the second diameter being at most 0.95 times, preferably at most 0.9 times, further preferably at most 0.85 times the size of the first diameter, or the first diameter being at most 0.95 times, preferably at most 0.9 times, further preferably at most 0.85 times the size of the second diameter. The imaginary cylinders can be coaxial with respect to one another, that is to say can share an axis. These values indicate the diameter reduction of the shaft vibration absorber after mounting. A greater diameter change can fundamentally lead to a higher pressing force, no other technical effect than in the disclosed range arising in the vicinity of each disclosed value. Merely the magnitude of the effect may vary.

In accordance with one development of the shaft vibration absorber according to the invention, the elastomer body has at least one radial stop means which protrudes in the radial direction in the second angle window, and may comprise a stop web, which is configured in such a way that, in the mounting state, it has a smaller extent in the radial direction than the holding geometries. The smaller radial extent is also present, however, in the premounting state. It is conceivable that radial stop means are arranged diametrically with respect to one another with regard to the longitudinal centre axis of the shaft vibration absorber, and are arranged in a mirror-symmetrical manner with regard to a central longitudinal plane, in which the longitudinal centre axis of the shaft vibration absorber and/or the first tuning axis lie/lies. A characteristic curve with a linear or progressive profile can be set and the service life can be improved by way of corresponding contouring of the elastomer body in a spatial direction in a manner which differs from that of the first tuning axis or in the direction of the second tuning axis.

In accordance with one conceivable development of the shaft vibration absorber according to the invention, the radial stop means is of elongated rectangular, triangular, semi-oval or semi-round configuration in cross section.

In accordance with one conceivable development of the shaft vibration absorber according to the invention, a radial distance between the circumferential face of the absorber mass and at least one of the holding faces corresponds, in the mounting state of the shaft vibration absorber, to at most 0.25 times, preferably at most 0.125 times, further preferably at most 0.1 times the absorber mass diameter.

In addition, an assembly is proposed according to the invention, comprising a shaft, and a shaft vibration absorber according to the disclosure which is pressed to the shaft via holding faces of holding geometries. The shaft vibration absorber can be, for example, an internal tube absorber which can be fastened in an inner cavity of a hollow shaft, or else can be a lateral shaft absorber which can be fastened to a shaft on the outer circumferential face. The shaft can be a longitudinal shaft or a lateral shaft. A plurality of shafts of the plurality of identical or different shaft vibration absorbers are also conceivable.

BRIEF DESCRIPTION OF THE DRAWINGS

Further features, details and advantages of the invention result from the wording of the claims and from the following description of exemplary embodiments on the basis of the drawings, in which:

DETAILED DESCRIPTION

Elements which are identical or correspond to one another are denoted in each case by the same reference signs in the figures, and will therefore not be described again, unless expedient. Features which have already been described will not be described again in order to avoid repetitions, and can be applied to all elements with reference signs which are identical or correspond to one another, unless ruled out explicitly. The disclosures contained in the entire description can be transferred mutatis mutandis to identical parts with identical reference signs and/or identical component designations. The position specifications selected in the description, such as for example top, bottom, sides, etc., can also relate to the directly described and illustrated figure, and, in the case of a positional change, can be transferred mutatis mutandis to the new position. Furthermore, individual features or combinations of features from the different exemplary embodiments which are shown and described can also represent independent solutions per se, inventive solutions or solutions according to the invention.

Figure 1:
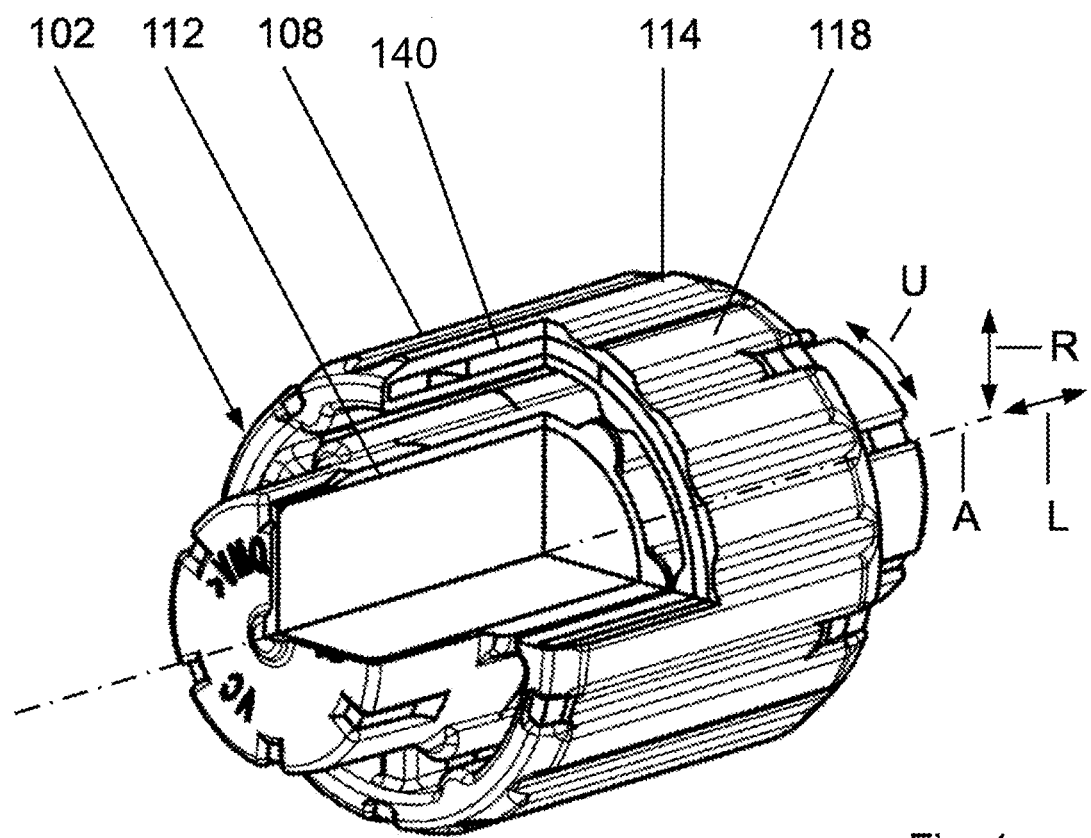
FIG. 1 shows an absorber which is known from practice.

FIG. 1 shows by way of example an absorber 102, known from practice, as an internal tube absorber in a premounting position. This absorber 102 is penetrated centrally by a longitudinal centre axis A and has a longitudinal direction L, a radial direction R and a circumferential direction U. The absorber 102 can be fastened in a shaft 4 for the absorption of vibrations, and comprises an elastomer body 108. The elastomer body 108 surrounds a central and fully cylindrical absorber mass 112, In FIG. 1, a part of the elastomer body 108 is hidden merely for reasons of illustration, in order to show the absorber mass 112. A fastening sleeve 140 is arranged as fastening element within the elastomer body 108 and on the circumferential side of the absorber mass 112. On the outer circumferential side of the fastening sleeve 140, the elastomer body 108 has holding geometries which protrude in the radial direction R from the fastening sleeve 140, extend in the longitudinal direction L, are configured in each case as longitudinal holding webs 114 and serve for pressing of the absorber 102 to a shaft. To this end, the longitudinal holding webs 114 in each case have an outer circumferential-side holding face 118. It can be seen then that the longitudinal holding webs 114 are all of identical configuration and are arranged spaced apart uniformly from one another in the circumferential direction U. Therefore, the absorber 102 is tuned identically in all radial directions R, for which reason it can be called a radial absorber. The fastening sleeve 140 serves firstly to engage behind the longitudinal holding webs 114 and, as a result, to realize a sufficiently great radial pressing force, and secondly to mount the absorber mass 112 in a freely vibrating manner in all radial directions R.

Figure 2:
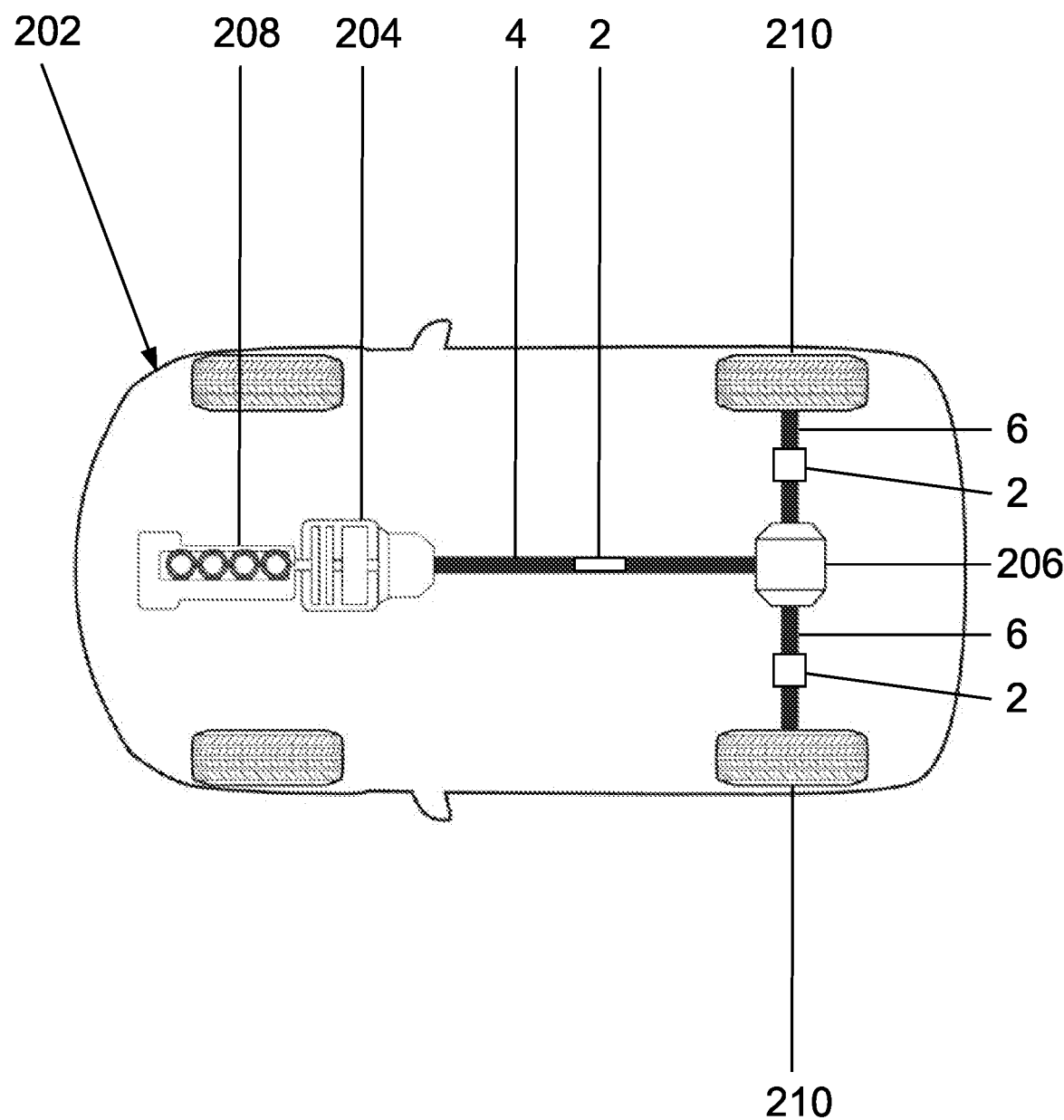
FIG. 2 shows a diagrammatic sectional illustration of a vehicle with shaft vibration absorbers.
Figure 3:
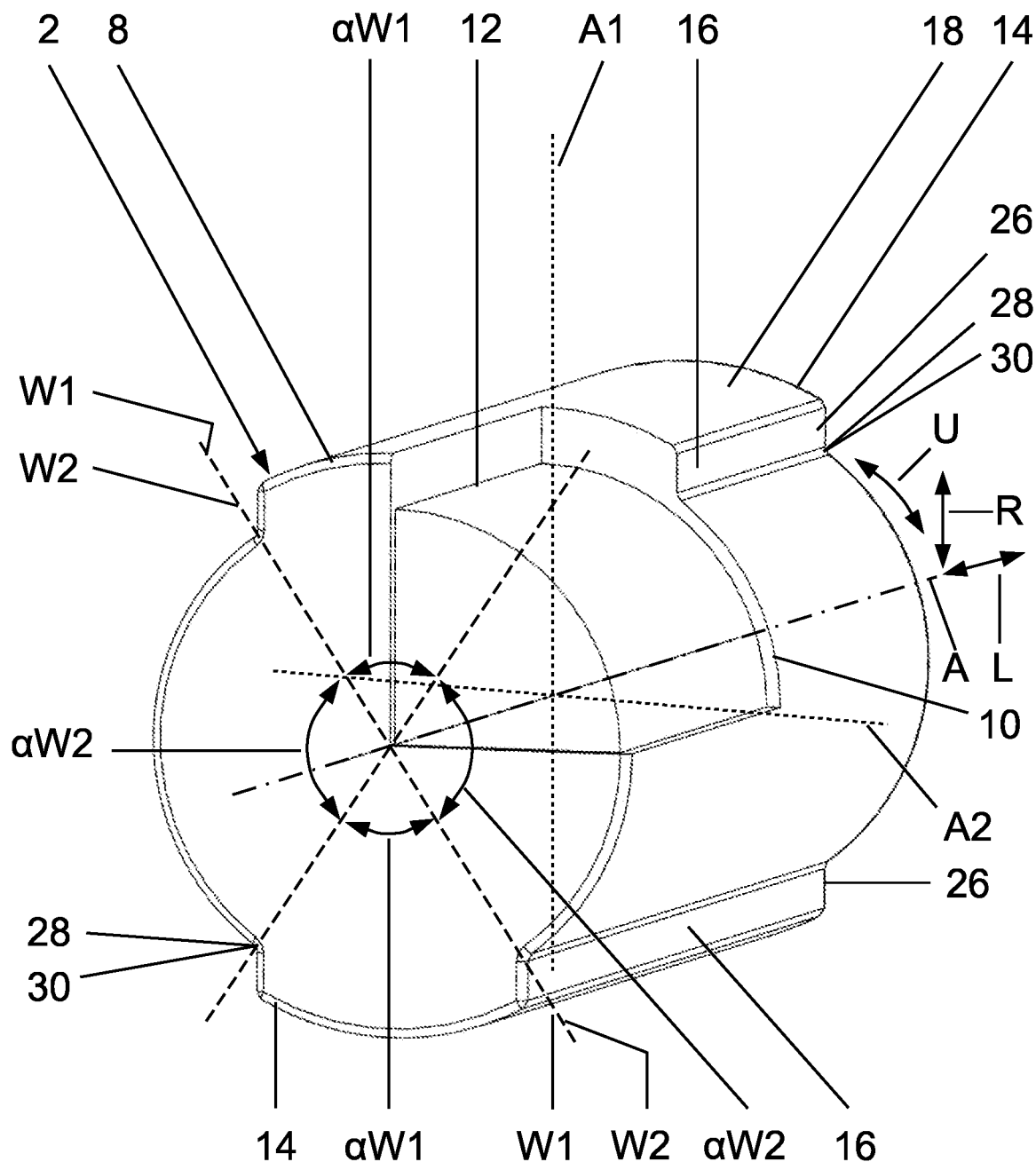
FIG. 3 shows a shaft vibration absorber according to aspects of the invention in accordance with a first embodiment in a perspective view.
Figure 4:
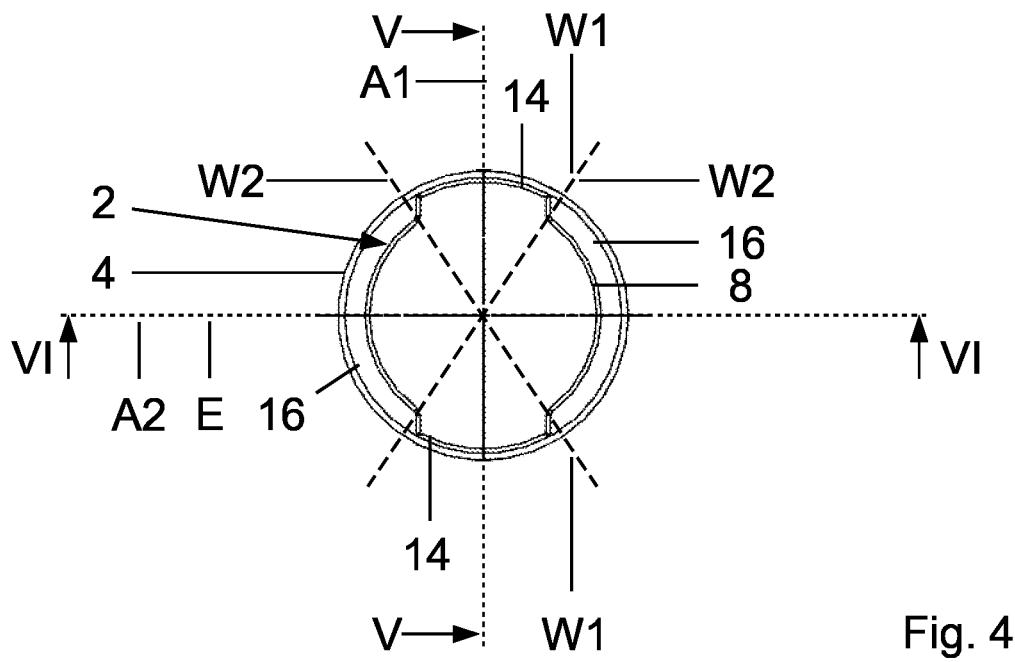
FIG. 4 shows the shaft vibration absorber according to FIG. 3 in a front view.
Figure 5:
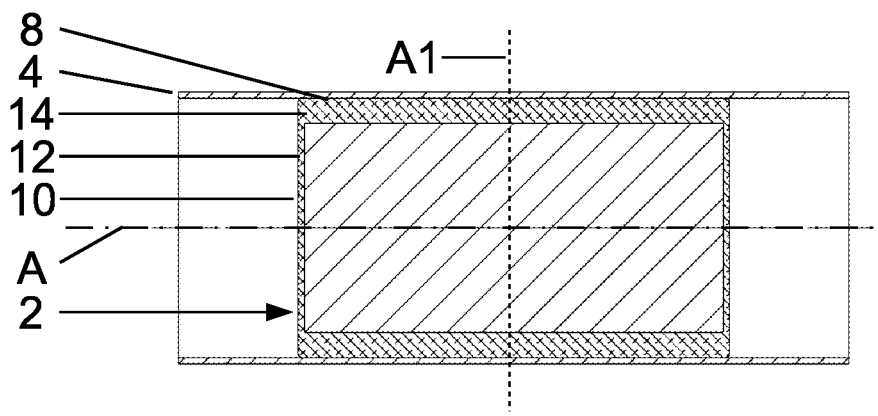
FIG. 5 shows the shaft vibration absorber according to FIG. 3 in a sectional view along the line V-V according to FIG. 4.
Figure 6:
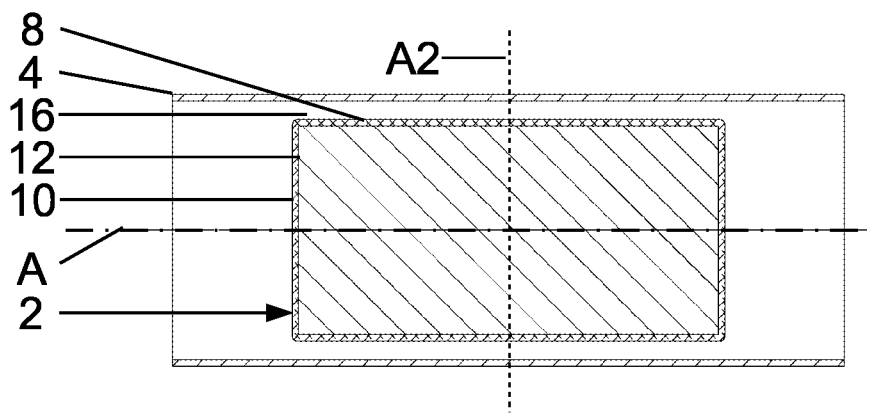
FIG. 6 shows the shaft vibration absorber according to FIG. 3 in a sectional view along the line VI-VI according to FIG. 4.

FIG. 2 shows a vehicle 202 with a transmission 204 in the front part of the vehicle and a differential 206 at the rear. The transmission 204 transmits the power of an engine 208 by means of a vehicle longitudinal shaft which can be a shaft 4, to the differential 206. The differential 206 in turn is connected to the rear wheels 210 via the lateral shafts which can be called shafts 6. The vehicle longitudinal shaft is hollow and comprises a shaft vibration absorber 2 according to the invention as internal tube absorber for absorbing vibrations of the shaft 4. The lateral shafts likewise in each case comprise a shaft vibration absorber 2 as lateral shaft absorber for absorbing vibrations of the respective shaft 6. Although a vehicle 202 with an internal combustion engine is shown here, the invention can also be readily transferred, however, to hybrid or fully electric vehicles.

According to the invention, in addition, an assembly is proposed, comprising a shaft and a shaft vibration absorber according to the invention which is pressed to the shaft via holding faces of holding geometries. The shaft vibration absorber can be, for example, an internal tube absorber which can be fastened in an inner cavity of a hollow shaft, or else can be a lateral shaft absorber which can be fastened to a shaft on the outer circumferential face. The shaft can be a longitudinal shaft or a lateral shaft. A plurality of shafts with a plurality of identical or different shaft vibration absorbers are also conceivable.

FIGS. 3 to 6 show a shaft vibration absorber 2 according to the invention in an embodiment as an inner tube absorber in the premounting position. This shaft vibration absorber 2 is penetrated centrally by a longitudinal centre axis A and has a longitudinal direction L, a radial direction R and a circumferential direction U. The shaft vibration absorber 2 can be fastened in a shaft 4 in order to absorb vibrations, and comprises a monolithic elastomer body 8. The elastomer body 8 is free from an integrally joined connection to a stabilizing element, in particular a fastening sleeve 140. The shaft vibration absorber 2 comprises a fully cylindrical absorber mass 12 which is surrounded completely by the elastomer body 8. A part of the elastomer body 8 is hidden in FIG. 3 merely for reasons of illustration, in order to show the absorber mass 12.

In contrast with known absorbers, by way of example shown by means of absorber 102 in FIG. 1, the shaft vibration absorber 2 according to the invention does not have any holding geometries which are spaced apart homogeneously from one another in the circumferential direction. To this end, the shaft vibration absorber 2 comprises two first angle windows W1 which lie diametrically opposite one another with regard to the longitudinal centre axis A and have an identical width of $\alpha W1$. The first angle windows W1 encloses, directly with one another in the circumferential direction U, two second angle windows W2 with an identical width of $\alpha W2$.

The elastomer body 8 has a hollow-cylindrical main body 10 and holding geometries which protrude therefrom in the radial direction R, extend in the longitudinal direction L, are configured in each case as longitudinal holding webs 14 and serve for pressing of the shaft vibration absorber 2 to the shaft 4. To this end, the longitudinal holding webs 14 in each case have an outer circumferential-side holding face 18, against which the shaft 4 bears in the mounting state. The longitudinal holding webs 14 extend over the entire longitudinal extent of the shaft vibration absorber. The longitudinal holding webs 14 extend between the absorber mass 12 and its respective holding face 18, without a stabilizing element, in particular a fastening sleeve, being connected in between. The longitudinal holding webs 14 are arranged merely in the first angle windows W1, and the two second angle windows W2 are free from holding geometries which serve for the pressing to the shaft 4. This leads to two different tuning axes A1 and A2 which intersect the longitudinal centre axis A being configured in the radial direction R.

The first tuning axis A1 runs centrally through the first angle windows W1, while the second tuning axis runs perpendicularly with respect thereto centrally through the two second angle windows W2. The shaft vibration absorber 2 is tuned or can be tuned highly along the first tuning axis A1 by means of the holding geometries. It is hard in this direction. A sufficiently high axial pressing force can be realised by way of this high tuning along the first tuning axis A1. The shaft vibration absorber 2 is tuned or can be tuned to the tuning frequency for the bending natural mode of the shaft 4 along the spatial direction which differs from the first tuning axis A1 or along the second tuning axis A2 which differs from the first tuning axis A1. It is soft in this direction. The primary function of the shaft vibration absorber 2 or its structures there is frequency tuning. Therefore, the shaft vibration absorber 2 configures a radial pressing force with the shaft 4 along the first tuning axis A1, which radial pressing force is greater than a pressing force along the second tuning axis A2.

In the embodiment which is shown, the holding geometries are arranged exclusively within the first angle windows A1. In the mounting state, 100% of the pressing force which holds the shaft vibration absorber 2 is therefore applied by the holding geometries within the two first angle windows W1.

The shaft vibration absorber 2 is arranged rotationally symmetrically with regard to the longitudinal centre axis A, wherein said rotational symmetry is a 2-fold rotational symmetry with a count number of two. In addition, the bolding geometries are arranged in a mirror-symmetrical manner with regard to a central longitudinal centre plane E. The longitudinal centre axis of the shaft vibration absorber lies in this central longitudinal centre plane.

The longitudinal holding webs 14 which are shown are of ring segment-like configuration in cross section, their respective side walls 26 which point in the circumferential direction U running parallel to the first tuning axis A1 as viewed in cross section. Therefore, each of the side walls 26 encloses an angle with the main body 10, which angle is greater than 90°. An edge 28 of the side wall base 30 is provided with a radius between each side wall 26 and the main body 10.

The two longitudinal holding webs 14 are configured in such a way that the two holding faces 18 have an angle sum of 120° with regard to the longitudinal centre axis in a cross section. The holding faces 18 which are arranged in the two first angle windows W1 on both sides of the longitudinal centre axis A are of equal size. Therefore, the shaft vibration absorber 2 uses merely ⅓ of its entire circumferential area for fixing it on the shaft 4.

That section of the main body 10 of the elastomer body 8 which is arranged in the two angle windows W2 serves as radial stop means. The two second angle windows W2 are configured as intermediate clearances 16, and are free from holding geometries which are primarily for pressing to the shaft 4, and accordingly advantageously serve to ensure vibration which is as free as possible of the shaft bearing 2 in the use state. The two angle windows W2 are of ring segment-like configuration in cross section, and are of open configuration on both sides in the longitudinal direction L. Their ring segment-shaped space extends in the circumferential direction U between the two first angle windows W1. In the radial direction, the ring segment-shaped space is delimited on the inner side by the elastomer body 8 or the elastomer section which surrounds the absorber mass 12 directly. On the opposite side, the ring segment-shaped space is of open configuration, with the result that it is delimited by the inner circumferential face of the shaft 4 in the mounting state.

As a consequence, the shaft vibration absorber 2 according to the invention does not have tuning with the radial natural frequency in all radial directions R. Rather, merely the frequency only in one direction (and the opposite direction) is tuned to the bending natural mode of the shaft 4. The frequency of the second radial direction (and the opposite direction) is tuned significantly more highly, in order that a required axial pressing force can be achieved in the mounting and use state, which axial pressing force fixes the shaft vibration absorber 2 on the shaft 4 in the long term.

FIGS. 7 to 10 show a shaft vibration absorber 2 according to the invention in one embodiment as a lateral shaft absorber in the mounting position. In order to avoid repetitions, merely the differences with respect to the first embodiment are to be explained in the following text.

Figure 7:
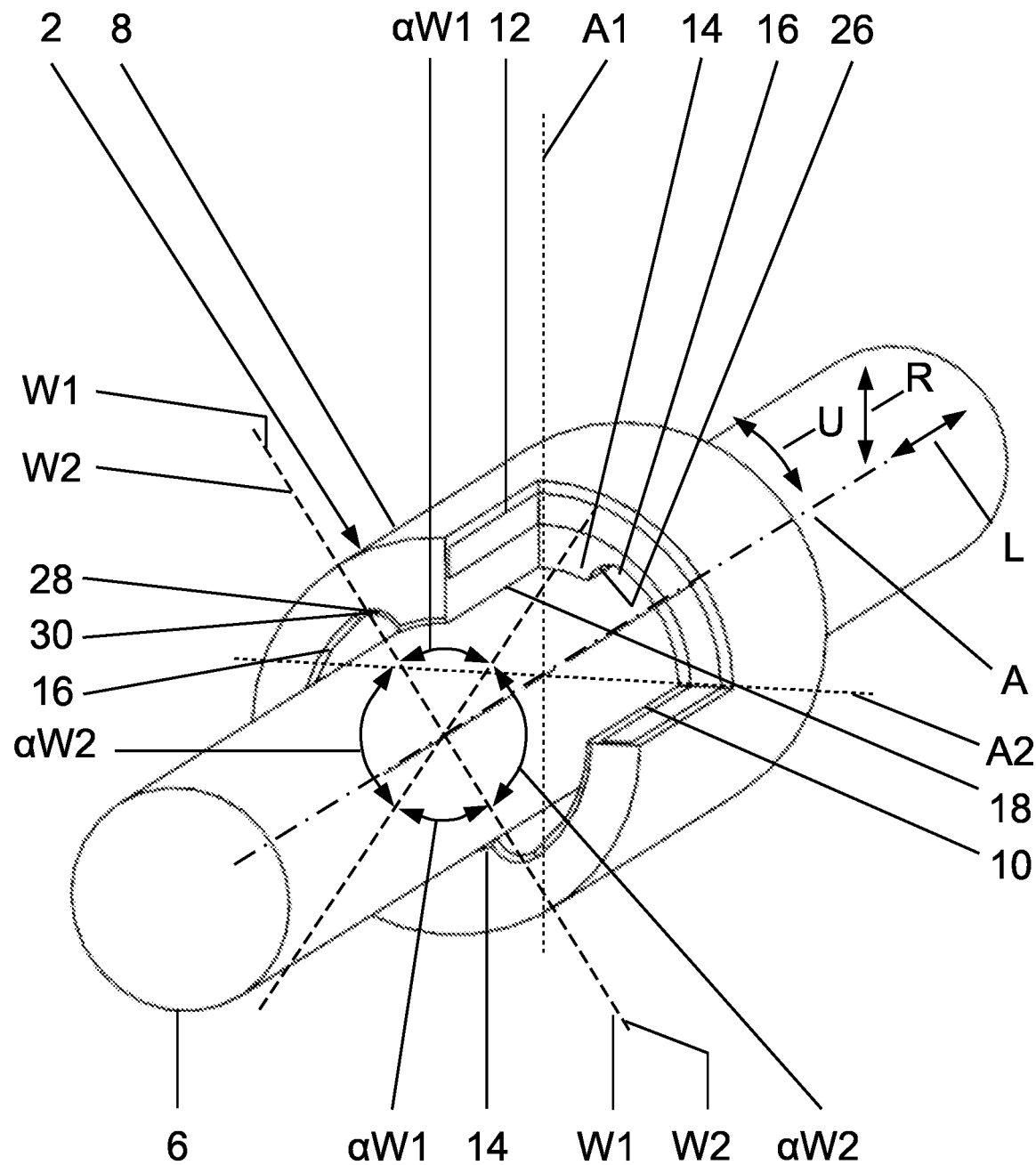
FIG. 7 shows a shaft vibration absorber according to aspects of the invention in accordance with a second embodiment in a perspective view.
Figure 8:
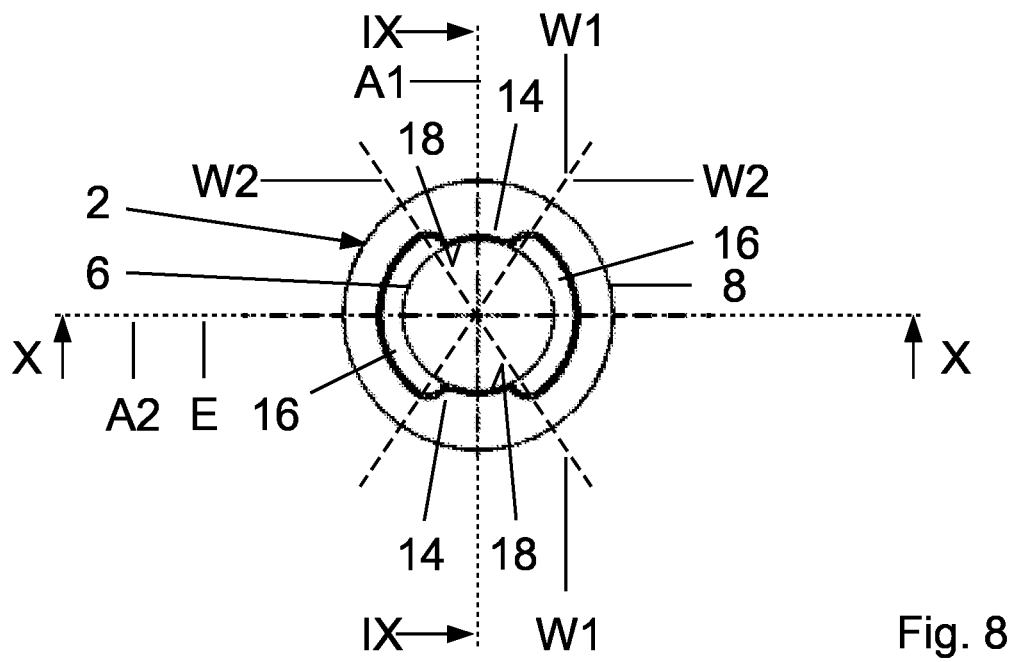
FIG. 8 shows the shaft vibration absorber according to FIG. 7 in a front view.
Figure 9:
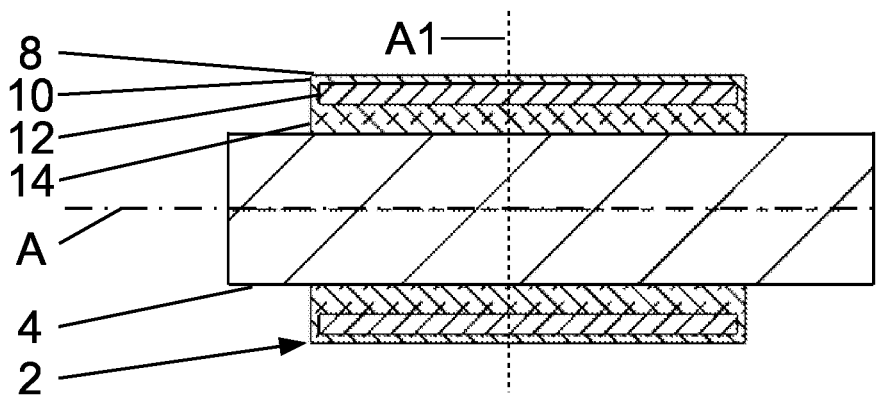
FIG. 9 shows the shaft vibration absorber according to FIG. 7 in a sectional view along the line IX-IX according to FIG. 8, and FIG. 10 the shaft vibration absorber according to FIG. 3 in a sectional view along the line X-X according to FIG. 8.
Figure 10:
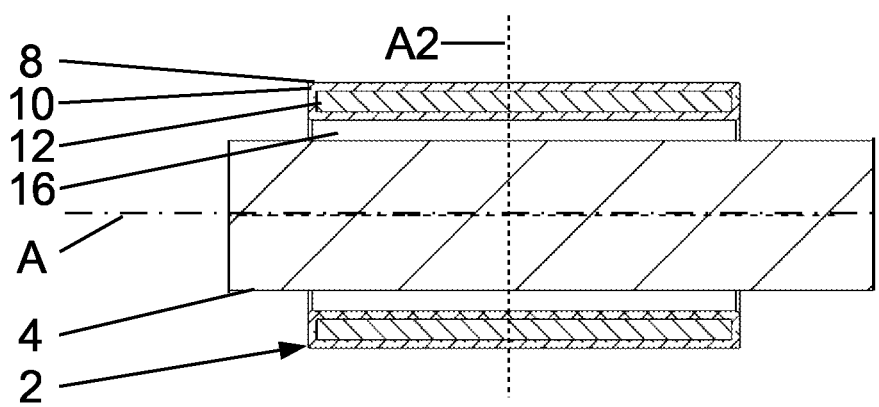

The shaft vibration absorber 2 is fastened to the circumference of the shaft 6 in order to absorb vibrations. The shaft vibration absorber 2 comprises a hollow-cylindrical absorber mass 12 which is surrounded completely by the elastomer body 8. In FIG. 7, a part of the shaft vibration absorber 2 is hidden merely for reasons of illustration, in order to show the absorber mass 12. The shaft vibration absorber does not have a stabilizing element, in particular a hose clip.

The longitudinal holding webs 14 in each case have an inner circumferential-side holding face 18, against which the shaft 6 bears in the mounting state.

The longitudinal holding webs 14 which are shown are of trapezoidal configuration in cross section, their respective side walls 26 which point in the circumferential direction U running in a curved manner with respect to the first tuning axis A1 as viewed in cross section. Each side wall 26 is configured as a radius, and merges on the side wall base-side into the main body 10. The two longitudinal holding webs 14 are configured in such a way that the two holding faces 18 have an angle sum of 100° with regard to the longitudinal centre axis in a cross section. The shaft vibration absorber 2 therefore uses merely approximately 28% of its entire circumferential area in order to fix it on the shaft 6.

The second angle windows W2 are of ring segment-like configuration in cross section, and are of open configuration on both sides in the longitudinal direction L. Their ring segment-shaped space extends in the circumferential direction U between the two first angle windows W1. In the radial direction, the ring segment-shaped space is delimited on the outer side by the elastomer body 8 or the elastomer section which surrounds the absorber mass 12 directly. On the opposite side, the ring segment-shaped space is of open configuration, with the result that it is delimited by the outer circumferential face of the shaft 6 in the mounting state.

The invention is not restricted to one of the above-described embodiments, but rather can be modified in a wide variety of ways. All of the features and advantages which are apparent from the claims, the description and the drawing, including structural details, spatial arrangements and method steps, can be essential to the invention both per se and in a wide variety of combinations.

All combinations of at least two of the features disclosed in the description, the claims and/or the figures fall within the scope of the invention.

In order to avoid repetitions, features disclosed in accordance with the device are also to apply and be capable of being claimed in accordance with the method. Features disclosed in accordance with the method are likewise to apply and be capable of being claimed in accordance with the device.

What is claimed:

1. A shaft vibration absorber for absorbing vibrations of a shaft, comprising:
    an elastomer body which is reached through by a central longitudinal centre axis, the elastomer body having holding geometries which protrude in the radial direction and extend in the longitudinal direction for pressing the shaft vibration absorber to said shaft, and the elastomer body is free from an integrally joined connection to a stabilizing element,
    wherein the holding geometries are arranged in each case in two first angle windows which lie opposite one another with regard to the longitudinal centre axis with a width of in each case at most 90°, the shaft vibration absorber is configured to generate a radial pressing force with the shaft along a first tuning axis which runs in the radial direction, and the radial pressing force is greater than a pressing force in a spatial direction which differs therefrom and runs in the radial direction.

2. The shaft vibration absorber according to claim 1, wherein at least one of the holding geometries has at least one longitudinal holding web.

3. The shaft vibration absorber according to claim 1, wherein the two first angle windows enclose at least two second angle windows with one another in the circumferential direction.

4. The shaft vibration absorber according to claim 3, wherein the second angle windows are configured as intermediate clearances or comprise intermediate clearances and/or are free from holding geometries which primarily serve for pressing to the shaft.

5. The shaft vibration absorber according to claim 1, wherein the holding geometries are arranged in a rotationally symmetrical manner with regard to the longitudinal centre axis.

6. The shaft vibration absorber according to claim 5, wherein there are two holding geometries.

7. The shaft vibration absorber according to claim 5, wherein the holding geometries are arranged in a mirror-symmetrical manner with regard to a central longitudinal centre plane.

8. The shaft vibration absorber according to claim 5, wherein there are two holding geometries, and the holding geometries are arranged in a mirror-symmetrical manner with regard to a central longitudinal centre plane.

9. The shaft vibration absorber according to claim 1, wherein the angular sum of the second angle windows with regard to the longitudinal centre axis in a cross section of the shaft vibration absorber is at least 180°.

10. The shaft vibration absorber according to claim 1, wherein the angular sum of the second angle windows with regard to the longitudinal centre axis in a cross section of the shaft vibration absorber is at least 220°.

11. The shaft vibration absorber according to claim 1, wherein the angular sum of the second angle windows with regard to the longitudinal centre axis in a cross section of the shaft vibration absorber is at least 240°.

12. The shaft vibration absorber according to claim 1, wherein the angular sum of circumferential-side holding faces of the holding geometries with regard to the longitudinal centre axis in a cross section is at most 180°.

13. The shaft vibration absorber according to claim 1, wherein the angular sum of circumferential-side holding faces of the holding geometries with regard to the longitudinal centre axis in a cross section is at most 160°.

14. The shaft vibration absorber according to claim 1, wherein the angular sum of circumferential-side holding faces of the holding geometries with regard to the longitudinal centre axis in a cross section is at most 140°.

15. The shaft vibration absorber according to claim 1, wherein the angular sum of circumferential-side holding faces of the holding geometries with regard to the longitudinal centre axis in a cross section is at most 120°.

16. The shaft vibration absorber according to claim 1, wherein the shaft vibration absorber is free from a stabilizing element, and the holding geometries extend between the absorber mass and its respective holding face and/or in the radial extent without a stabilizing element connected in between.

17. The shaft vibration absorber according to claim 1, wherein, in the unloaded premounting state of the shaft vibration absorber, holding faces lie on a first imaginary cylindrical surface with a first cylinder diameter and, in the mounting state of the shaft vibration absorber, in which it can be pressed to the shaft, the holding faces can lie on a second imaginary cylindrical surface with a second cylinder diameter, either the second diameter is at most 0.95 times the size of the first diameter, or the first diameter is at most 0.95 times the size of the second diameter.

18. The shaft vibration absorber according to claim 17, wherein either the second diameter is at most 0.90 times the size of the first diameter, or the first diameter is at most 0.90 times the size of the second diameter.

19. The shaft vibration absorber according to claim 17, wherein either the second diameter is at most 0.85 times the size of the first diameter, or the first diameter is at most 0.85 times the size of the second diameter.

20. The shaft vibration absorber according to claim 1, wherein the elastomer body has at least one radial stop which protrudes in the radial direction in the second angle window, which is configured such that, in the mounting state, the at least one radial stop has a smaller extent in the radial direction than the holding geometries.

21. An assembly, comprising
a shaft, and
a shaft vibration absorber according to claim 1 which is pressed to the shaft via holding faces of holding geometries.

* * * * *